United States Patent [19]
Hinnenkamp

[11] Patent Number: 4,781,149
[45] Date of Patent: Nov. 1, 1988

[54] PREFABRICATED CATTLE STALL

[76] Inventor: Charles F. Hinnenkamp, P.O. Box 135, Melrose, Minn. 56352

[21] Appl. No.: 715,576

[22] Filed: Mar. 22, 1985

[51] Int. Cl.⁴ .............................................. A01K 1/00
[52] U.S. Cl. ........................................ 119/27; 256/19; 256/73
[58] Field of Search ................... 119/20, 27, 155; 256/19, 24, 73, 130; 52/785

[56] References Cited

U.S. PATENT DOCUMENTS

| | | | |
|---|---|---|---|
| 1,142,246 | 6/1915 | Gagan | 119/27 |
| 2,027,493 | 1/1936 | Thilborger | 256/19 |
| 2,717,187 | 9/1955 | Morgan et al. | 52/785 X |
| 3,330,080 | 7/1967 | Grieb et al. | 52/785 X |
| 4,175,639 | 11/1979 | Wirt | 256/19 X |

FOREIGN PATENT DOCUMENTS

| | | | |
|---|---|---|---|
| 567912 | 9/1931 | Fed. Rep. of Germany | 119/27 |
| 2382561 | 11/1978 | France | 119/27 |
| 2489658 | 3/1982 | France | 119/27 |

*Primary Examiner*—Robert P. Swiatek
*Attorney, Agent, or Firm*—Michael E. Kiteck

[57] ABSTRACT

A modular cattle stall structure which is set into or affixed to the floor of a barn or similar building to define spaces for the cattle and provide separation between them. The modules are arranged in a linear array so that one module is between the space for two cattle and each module defines one boundary for the cattle on each side of it. Half modules are provided for the end stall and the unitary structure has no crevices or places to retain dirt so that maintainance of a sanitary condition is simplified.

14 Claims, 4 Drawing Sheets

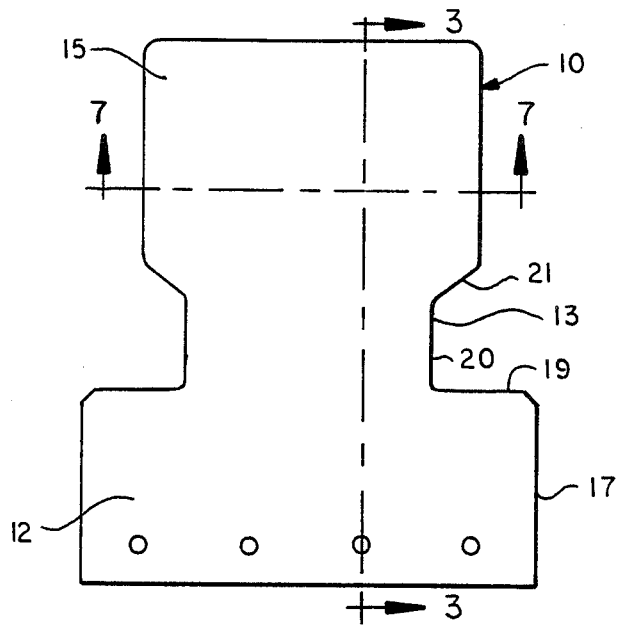
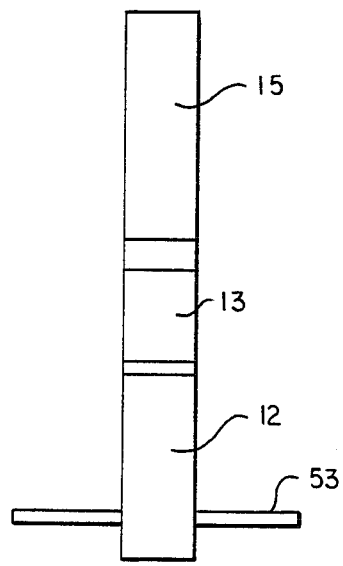
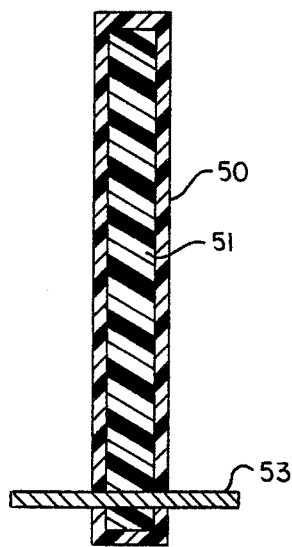
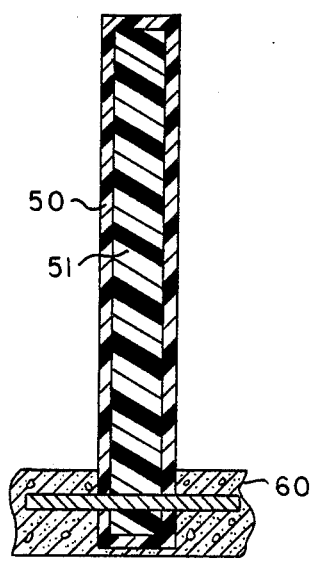
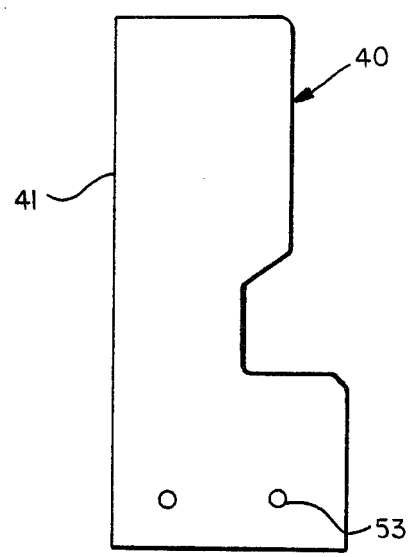

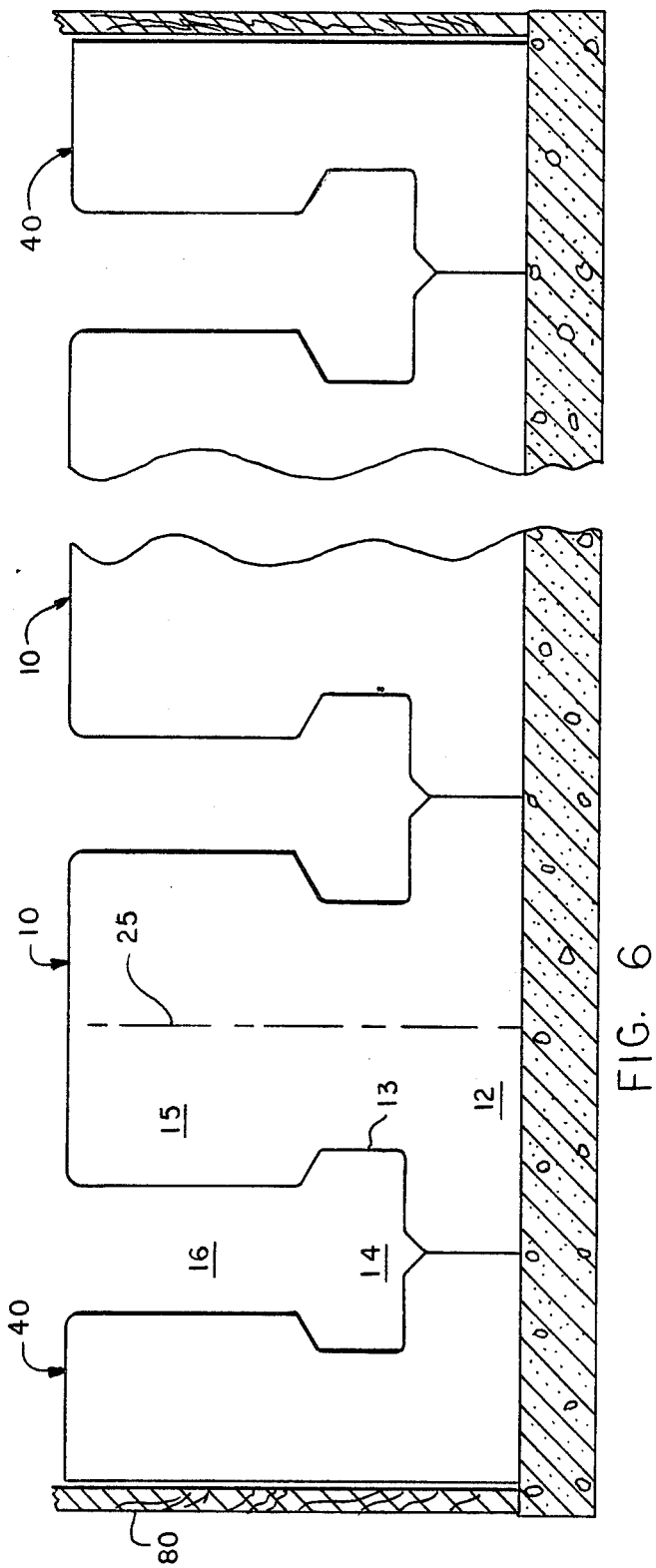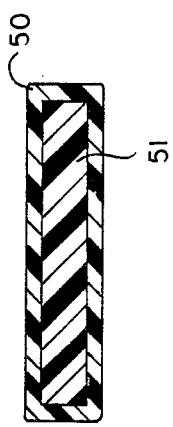

PREFABRICATED CATTLE STALL

This application is a continuation of application Ser. No. 465,751, filed Feb. 11, 1983, now abandoned.

BACKGROUND OF THE INVENTION

The invention relates to stall for cattle and especially for dairy cows and the means of defining stall spaces and securing a cow in position therein. The current practice in dairy barn construction is to construct the floor of concrete, usually with a trough formed therein at a proper location to catch offal. The trough may have a mechanized system for removal of manure and such refuse. Upon the barn floor, cattle stalls or milking parlors are constructed to facilitate control of the cows and ease of milking operations. In earlier times stalls made primarily of wood were used. Presently, for reasons of cleanliness, most stall and milking parlor components are made of metal or metal and wood. While such components are fairly easy to keep clean and quite durable, they are also expensive to make and to install. In addition, metal tube structures and components are subject to corrosion and attack by acids from silage and other cattle feeds which collect on the floor or curb to which the metal tube is attached. Recently post and panel construction has been employed in this application, but again this construction is fairly expensive U.S. Pat. No. 1,054,887 to Erf discloses a cow stall with a post and panel construction with panels that rotate upon the posts to form stalls or a continuous open walkway for the cows from side to side.

Another stall construction is described in U.S. Pat. No. 4,102,307 which shows portable modular wall panels, using tubular metal framing for the wall panels. While this patent shows complete walls from floor to an appropriate height, it is illustrative of the tube and panel construction.

None of the present structures or methods for constructing cattle stalls for use in dairy barns is truly economical or quick and simple to install or truly easy to cleanse for sanitary purposes.

SUMMARY OF THE INVENTION

The present invention relates to cattle stalls formed of modular self-supporting panels and metal tube for use in a dairy barn. Specifically, I have been successful in providing a modular cattle stall construction which is quick and simple to install, easy to cleanse and adaptable to standard ties and milking hardware.

One of the objects of the invention is to provide a cattle milking stall which is simple and easy to manufacture.

Another object of the invention is to provide a cattle milking stall which is easy to install in a dairy barn.

Still another object of the present invention is to provide a cattle milking stall which has a continuous smooth surface for ease of cleansing.

Yet another object of the present invention is to provide a cattle milking stall which accommodates standard tie and milking hardware.

A further object of the present invention is to provide a cattle milking stall which resists rot and corrosion from acids and moisture.

With these and other objects in view the invention broadly comprises a modular cattle milking stall construction having a front panel made of or covered with a high molecular weight organic material which is durable and resistant to wear and abuse and having metal tube stall sides.

BRIEF DESCRIPTION OF THE DRAWINGS

In the drawings:

FIG. 1 is a front elevation of the modular front panel of the present invention.

FIG. 2 is a side elevation of the modular front panel of the present invention.

FIG. 3 is a side section of the front panel taken on line 3—3 of FIG. 1.

FIG. 4 is a side section of the front panel similar to that of FIG. 3 installed in a concrete barn floor.

FIG. 5 is a front elevation of an end front panel used at the end of a row of stalls.

FIG. 6 is a front elevation of an array of modular front sections forming a continuous row of stalls and showing the concrete floor in front of the modular sections in section.

FIG. 7 is a top section of the front panel taken on line 7—7 of FIG. 1.

DESCRIPTION OF THE PREFERRED EMBODIMENT

Figure 8:
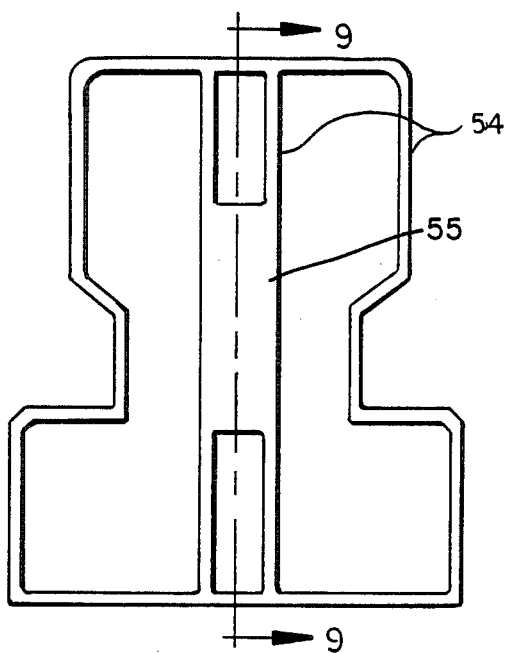
FIG. 8 is a front elevation of a second embodiment of the modular front panel.

Referring now more particularly to the drawings, reference numerals will be used to denote like parts or structural features in the different views. The numeral 10 denotes generally a modular panel which forms the front boundary of two half stalls. The individual modular panel is best seen by reference to FIG. 1. The modular panel 10 has a fairly broad lower portion 12 with vertical sides 17. Above the lower portion 12 is a large indentation 13 at each side of modular panel 10. Above indentation 13 is a top portion 15 which is wider than the portion of modular panel 10 between indentations 13 and narrower than lower portion 12. Top portion 15 has generally vertical sides. Indentation 13 has horizontal bottom 19, vertical side 20 and a sloping top 21.

Figure 9:
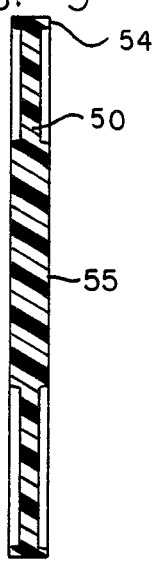
FIG. 9 s a cross section of the second embodiment of the modular front panel taken on line 9—9 of FIG. 8.
Figure 10:
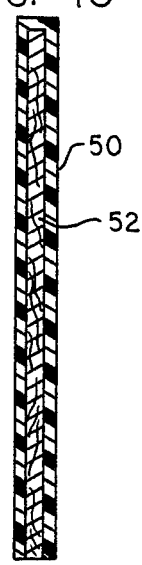
FIG. 10 is a cross section of another embodiment of the modular front panel.

Panel 10 may be assembled from several separate pieces, but fusing all of the parts into a single module eliminates gaps between the component parts which could trap dirt and disease organisms. The simplest panel construction is obtained by locating the break between modules at the center of each stall where the barrier forming the front boundary of the stall is lowest. Various materials may be employed in manufacture of modular panel 10. The panels may be formed entirely of an organic polymeric material such as plastic or plastic filled with fiberglass or other material as shown in FIGS. 8 and 9, or of an organic polymeric material such as plastic or plastic material 50 reinforced with fiberglass or other reinforcing fibers or reinforcing material overlaid over a rigid plastic foam core 51, as shown in FIGS. 3 and 4, or a rigid wood core 52 (FIG. 10) which may be solid or a laminated material such as plywood.

When a modular panel 10 is made without a core, rigidity may be achieved by forming ribs 54 in the panel 10. Such ribs 54 have a larger cross section as shown in FIG. 9 than the remainder of the panel 10 and permit a thinner section over the balance of the panel.

When two or more modular panels 10 (a plurality) are placed together side to side as shown in FIG. 6, the adjacent vertical sides 17 of the lower portions 12 abut flush one to the other so that the lower portions 12 of the two panels 10, or of however many are aligned side by side in a straight row, form a continuous unbroken barrier. Above the barrier formed by lower portions 12, at each juncture between two panels 10, the adjacent indentations 13 are in register forming a large opening 14. This opening 14 is topped by a vertical slot 16 open at its top and continuous at its bottom with the large opening 14. The slot 16 is formed because the top portions 15 of panels 10 are not as wide as lower portions 12 so that a gap remains between adjacent top portions when the lower portions 12 are in contact. The sides of lower portions 12 need not be vertical and may be slanted or interlock tongue and groove fashion but the sides of lower portions 12 must mate together in close contact with no gaps. The large opening may be eliminated so that the slot is of generally uniform width from top to bottom.

At the left in FIG. 6 may be seen a special modular end panel 40 which is similar to half a standard modular panel 10. This end panel 40 has a vertical side 41 for joining to a side wall or partition, and may be as wide as half a standard panel 10 or a little wider. A complete row of panels 10 would have an end panel 40 at each end of the row as shown in FIG. 6.

In FIG. 6 the center line 25 of the first standard or whole panel 10 is shown. The center line 25 and side wall 80 are generally the boundaries of one stall. It may be seen that a stall 30 will be formed at the juncture between any two panels 10 or between a panel 10 and an end panel 40. The large opening 14 and slot 16 will keep a cow's head in one location and generally adjacent cows will maintain separation of bodies.

Thus, modular panels 10 may be arranged linearly like a low wall made up of individual panels 10 and with large openings 14 and slots 16 at the juncture of any two panels 10. Slot 16, being open at the top, allows a cow to walk up to it and lower its head into and through slot 16 into large opening 14. Once in this position the sides of opening 14 allow a cow to feed in a certain range along a feed trough 35 in front of the row of panels 10. Normally a cow will lay down upon the barn floor and edge forward toward the food in front of the stall, pushing against the lower portions of the panels in front of it which form a continuous lower barrier in front of the cow. Since the front limbs of the cow are under it, the joints of these limbs will come into contact with the lower barrier formed by the panels and rub against it when the cow moves. The smooth surface of this barrier prevents abrasions to the limbs of the cow thereby eliminating open sores, damage and possible associated disease, all of which would reduce milk production and health of the cows.

Figure 11:
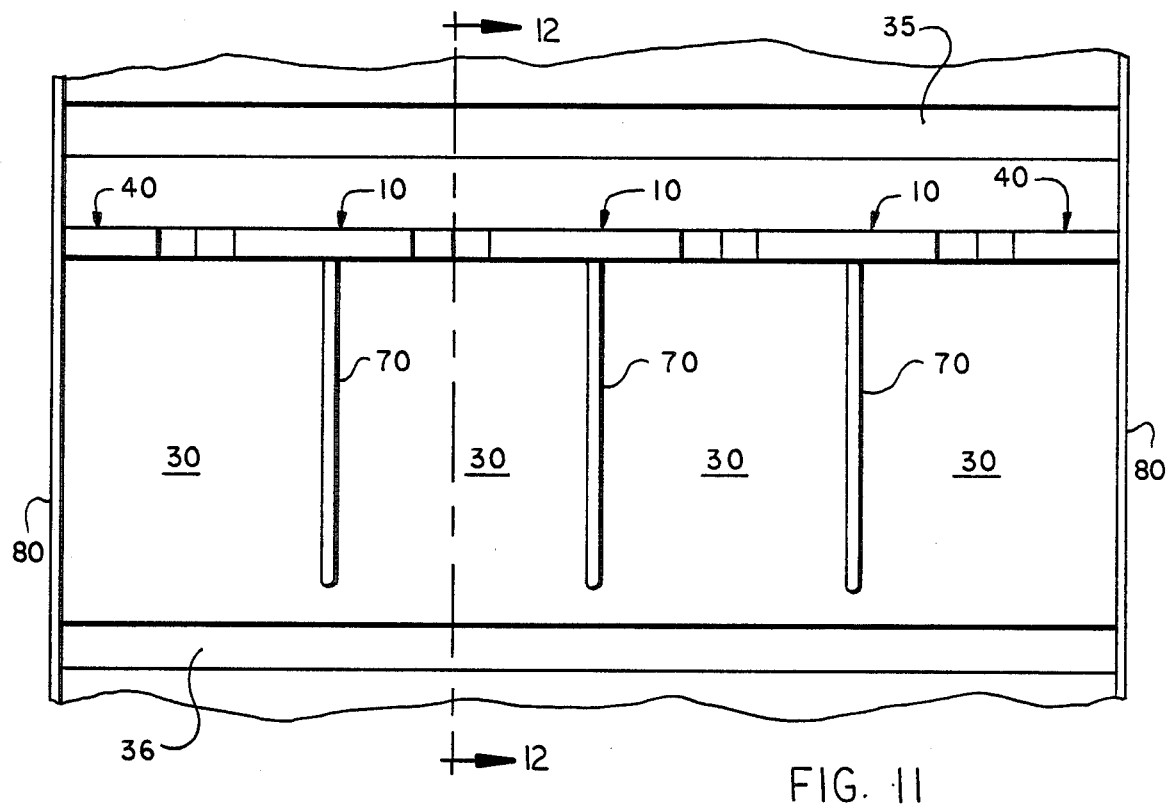
FIG. 11 is a top view of a row of stalls employing the present invention.
Figure 12:
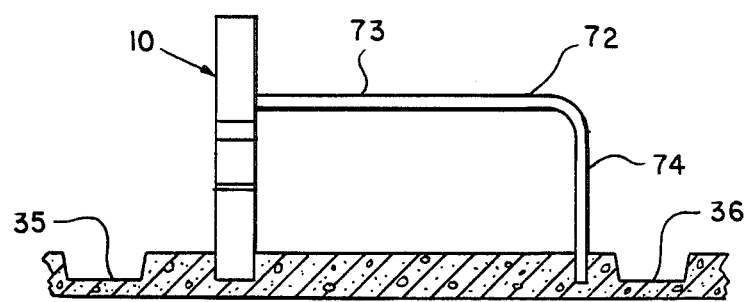
FIG. 12 is a side section taken on line 12—12 of FIG. 11.

It may be desirable to maintain more complete separation between cows. This may be achieved by providing a separator 70 between stalls 30. FIG. 11 shows a top view of a row of stalls 30. Between each stall 30 is a separator 70 which may be a solid side panel constructed of the same materials as the modular panels forming the front of the stalls, or a metal tube 72. A solid panel would have its lower end embedded in or affixed to the barn floor 60. FIG. 12 shows a metal tube 72 used as a separator 70. One end of metal tube 72 is attached to the center line 25 of panel 10 and has the other end embedded or attached to the barn floor 60. In the configuration shown, the metal tube 72 has a horizontal section 73 and a downwardly extending section 74. The downwardly extending section 74 may be sloped as shown or vertical.

A feed trough 35 is shown in FIGS. 11 and 12 which may be better utilized than a flat floor for containing cattle feed. An offal trough 36 is also shown.

As is shown in FIG. 4, the modular panel 10 may be installed by pouring a concrete floor about it so as to embed the lower few inches of it within the finished barn floor 60. Short sections of rod 53, which may be steel reinforcing bar (rebar) or other rod material, may be molded into the lower few inches of modular panel 10 so as to project outward from its surface to provide a stronger connection with concrete barn floor 60. The modular panel 10 may also be affixed to an existing barn floor 60 with standard mounting hardware such as bolts. The outer surface of modular panel 10 is smooth and free of holes or porosity such as that of wood so that it does not collect dirt and is easily cleaned.

The installation of the modular panels may be accomplished all in one operation which goes very quickly. Conventional stall installation by contrast requires the installers to go to the job site more than once. As noted previously, metal tube structures tend to corrode at the floor line where moisture and acids collect. To lengthen the life of metal tube and other metal components, most metal parts are mounted to a raised concrete curb. The curb must be poured and allowed to harden for two to three days before the metal parts may be fully assembled necessitating a return trip. Even when so raised off the floor, corrosion occurs since moisture and acids collect on the curb itself. Thus, the modular panel structure results in quicker and less expensive installation as well as superior durability compared to metal structures.

If the modular panel 10 is made without a reinforcing wood core 52 or foam core 51, it may most economically be formed with reinforcing ribs 54 projecting perpendicular to its surface. Also, thickened mounting portions 55 may be added for securing of hardware. Such mounting portions 55 are suited for attaching separators 70 such as metal tube 72. Additionally hardware such as tie hardware 75 which may be a snap ring may be mounted upon a panel 10 to secure a cow within a stall 30.

In use, the cow stall so formed by modular panels 10, with or without metal tubes 72 or solid side panels 71, serves as an efficient and sturdy stall construction. It is readily cleansed and aired. The barrier between stalls formed by the modular panels 10 serves to regulate the quantity of food allotted to each cow in the space or trough ahead.

The construction is simple to manufacture and very easy to install in dairy barns by merely embedding the lower end in concrete.

The invention accordingly economically and effectively carries out the aforementioned objectives.

Having now therefore fully illustrated and described my invention, what I claim to be new and desire to protect by United States Letters Patent is:

1. A cattle stall construction which comprises a plurality of panels in linear register side by side, each panel of which further comprises a broad lower portion, a relatively narrow intermediate portion and a top portion broader than the intermediate portion and narrower than the lower portion, so that the adjacent lower portions mate together in close contact to form a continuous lower barrier above which is formed a wide opening between the narrow intermediate portions of any two adjacent panels and above the wide opening is formed a narrower vertical opening between the top portions of any two adjacent panels and which narrower vertical opening is continuous with the wide opening below it, in which the panels are formed of plastic.

2. The cattle stall of claim 1 wherein the plastic contains reinforcing fibers.

3. A cattle stall construction which comprises a plurality of panels in linear register side by side, each panel of which further comprises a broad lower portion, a relatively narrow intermediate portion and a top portion broader than the intermediate portion and narrower than the lower portion, so that the adjacent lower portions mate together in close contact to form a continuous lower barrier above which is formed a wide opening between the narrow intermediate portions of any two adjacent panels and above the wide opening is formed a narrower vertical opening between the top portions of any two adjacent panels and which narrower vertical opening is continuous with the wide opening below it, in which the panels are formed of a plastic material over and covering a rigid core.

4. The cattle stall of claim 3 wherein the core is of wood.

5. The cattle stall of claim 4 wherein the plastic contains reinforcing fibers.

6. The cattle stall of claim 3 wherein the core is of polymeric foam.

7. A cattle stall construction which comprises two panels in linear register side by side, each panel of which further comprises a broad lower portion, a large indentation at each side of the panel above the broad lower portion, and a top portion wider than the portion of panel between indentations and narrower than the bottom portion so that a vertical slot is formed between the top portions of the panels which is continuous with a large opening formed between the adjacent indentations in the two panels.

8. The cattle stall of claim 7 wherein the panels are formed of an organic polymeric material.

9. The cattle stall of claim 8 wherein the organic polymer contains fibers of reinforcing material.

10. The cattle stall of claim 8 wherein the panel has a smooth surface.

11. The cattle stall of claim 7 wherein the panels are formed of an organic polymeric material over a core.

12. The cattle stall of claim 11 wherein the panel has a smooth surface.

13. The cattle stall of claim 11 further comprising short sections of rod molded into the lower few inches of the panel so as to project outward from its surface.

14. A cattle stall construction which comprises a plurality of panels in linear register side by side, each panel of which further comprises a broad lower portion, a relatively narrow intermediate portion and a top portion broader than the intermediate portion and narrower than the lower portion, so that the adjacent lower portions mate together in close contact to form a continuous lower barrier above which is formed a wide opening between the narrow intermediate portions of any two adjacent panels and above the wide opening is formed a narrower vertical opening between the top portions of any two adjacent panels and which narrower vertical opening is continuous with the wide opening below it.

* * * * *